Figure 4:
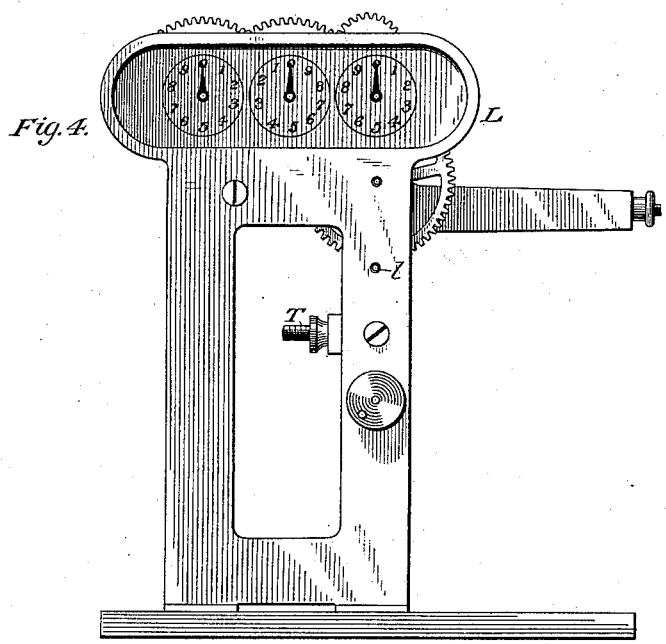

(No Model.) 3 Sheets—Sheet 1.
E. WESTON
ELECTRICAL METER.
No. 304,881. Patented Sept. 9, 1884.
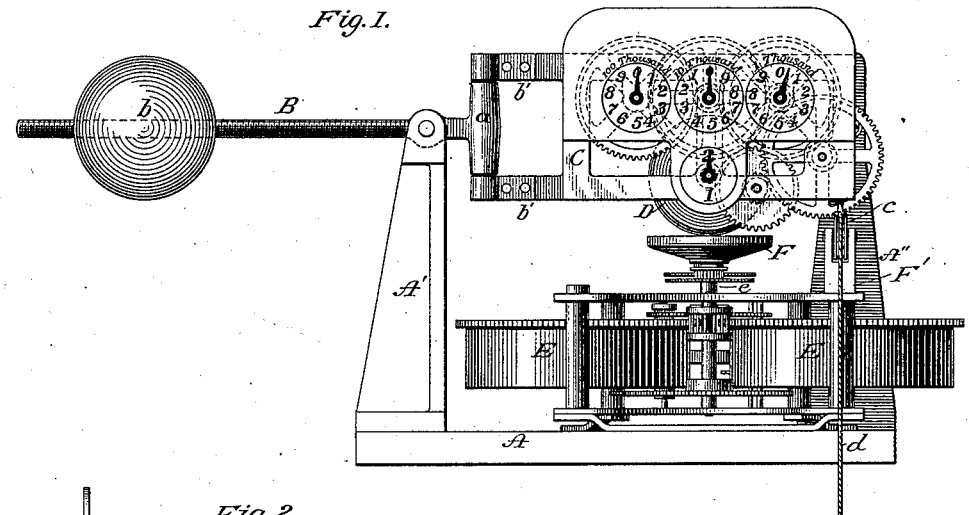
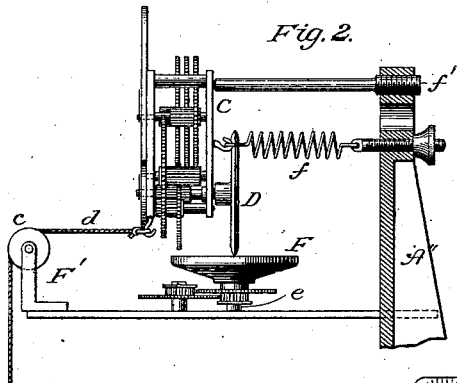
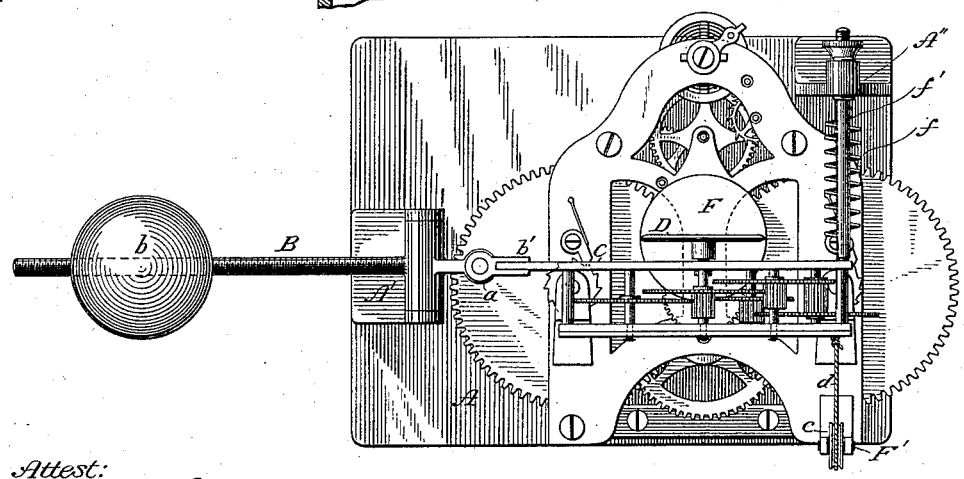
Attest:
Raymond F. Barnes.
W. H. Doggett.
Inventor
Edward Weston
By Parker W. Page atty.

(No Model.) 3 Sheets—Sheet 2.

E. WESTON.
ELECTRICAL METER.

No. 304,881. Patented Sept. 9, 1884.

Attest:
Raymond F. Barnes.
W. H. Doggett.

Inventor:
Edward Weston
By Parker W. Page
atty.

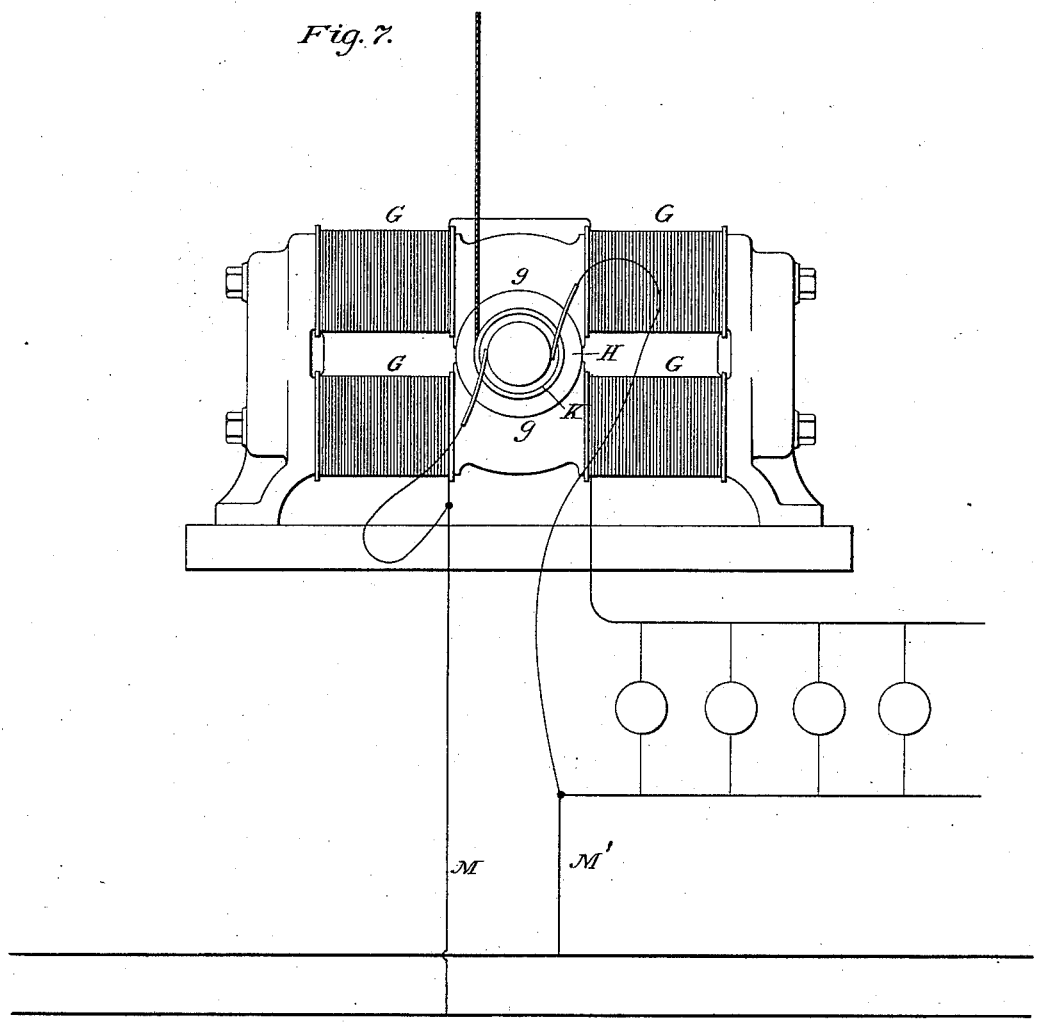

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

ELECTRICAL METER.

SPECIFICATION forming part of Letters Patent No. 304,881, dated September 9, 1884.

Application filed November 28, 1883. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Electrical Meters, of which the following is a specification, reference being had to the drawings accompanying and forming a part of the same.

The object of my present invention is to produce an apparatus to be used with electric circuits, from which the devices used are run in multiple arc as a registering-meter, and capable of recording in units of a given scale the total current-energy consumed or expended in a given time by the devices connected with such circuit.

The apparatus which I have devised for carrying out my invention is composed of two parts or devices, one a recording mechanism the other an electro-magnetic regulating mechanism. The former is constructed so as to be capable of recording a greater or less number of units in a given time, while the latter is constructed to operate in such manner in the regulation or control of the recording mechanism that the record may be an indication of the total current energy expended in running the devices in the circuit during a given time. In order that this may be effected, it is necessary that the electro-magnetic regulator should operate in accordance not only with the amount of current employed, but with the strength of said current. For this purpose I employ as a regulator, an electro-magnetic system comprising two electro-magnets, one of which serves as an armature, and is made movable and opposed by a spring or its equivalent. One of these electro-magnets, by preference the stationary one, I connect up with one of the main conductors of the circuit with which it is to be used. The armature I also construct as an electro-magnet, and connect its coils in a branch or cross circuit between the two main conductors. I further construct or arrange these elements in such manner that the armature shall move in a uniform field, so that its movement shall be in proportion to the degree of mutual attraction existing between itself and the magnet. Under these conditions the movement of the armature will be effected, first, by the amount of current flowing in the electro-magnet coils; and, second, by the electro-motive force in the circuit, which determines the amount of current passing in the cross-circuit including the armature-coils, and as the movement of the armature is proportional to the attractive force which these causes produce, the recording mechanism, the operation of which is controlled by such movement, will indicate the expenditure of current energy which takes place.

I have illustrated in the accompanying drawings a practical embodiment of the invention.

Figure 5:
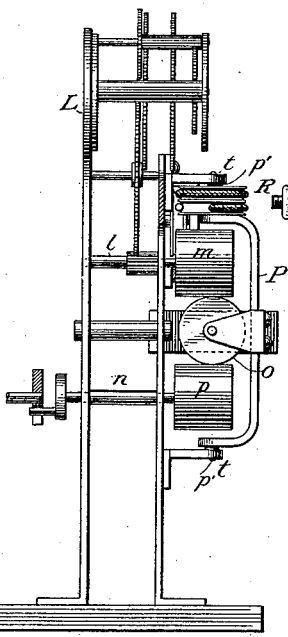
Figure 6:
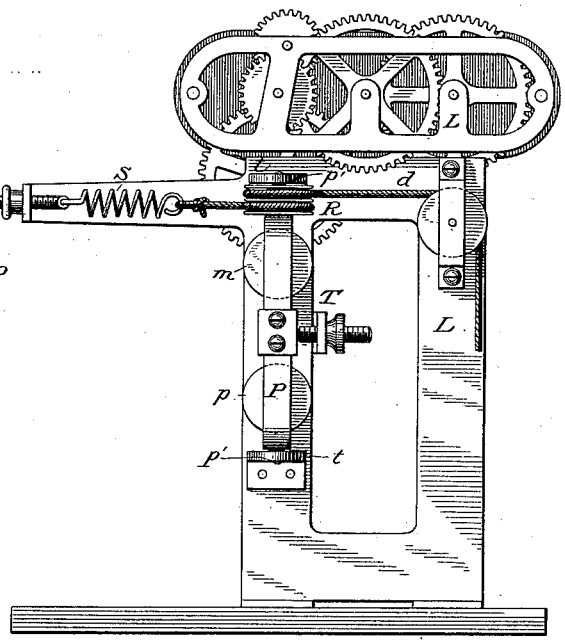

Figure 1 is a side elevation of the recording mechanism. Fig. 2 is a plan view of Fig. 1. Fig. 3 is a side view of a portion of the recording mechanism. Fig. 4 is a side elevation of a modified form of recording device; Fig. 5, an end view of the same; Fig. 6, a rear view of the apparatus shown in Figs. 4 and 5, and Fig. 7 a diagram illustrating the regulating device and the manner of connecting the same with the circuits to be used.

Referring to Fig. 1, A designates a baseplate; A' A", standards secured thereon or cast in one piece with it. To the standards A' is pivoted a lever, B, with a long arm, upon which is an adjustable weight, $b$, and a short arm ending in a bar, $a$, at right angles to the lever. C is a frame hinged by arms $b'$ to the bar $b$ in such manner as to be capable of movement in a plane at right angles to that of the lever B. In the frame C is arranged a train of register-wheels with pointers on the several spindles that turn in face of dial-plates graduated to indicate the revolutions of the said spindles, or the units of any scale corresponding thereto. Upon the main or first shaft of this train is fixed a friction-wheel, D. Upon the plate A is set a motor, in this instance a clock-movement with two stout springs, E E, and ordinary reducing-gears that impart a slow movement to a spindle, $e$. Upon the end of this spindle is fixed a friction-disk, F. Normally the friction-wheel D rests upon the center of the disk F, the weight $b$ being adjusted to produce the requisite pressure between the two. No motion will be imparted to the wheel D or the register therefor by the rotation of the disk F so long as they remain in these relative positions. If the frame C be shifted to one side, however, and the wheel D brought nearer the periphery of the disk F, it will receive a rotary movement which will be proportioned to the distance from the center of the point on the disk upon which it bears. The frame C is connected to the standard A″ by an adjustable spiral spring, $f$. An adjustable stop, $f'$, extends from the standard A″ in the path of frame C, and serves to limit the movement of said frame. A standard, F′, on the plate A or the frame of the clock-movement carries a grooved wheel, $c$, over which passes a cord, $d$, connected the one end to the frame C, the other to the movable part of the electro-magnetic regulating mechanism placed in a convenient position below.

The parts now described compose the recording mechanism. The regulator which I prefer consists of a device constructed in the main in the same manner as the electric generators and motors which I have described in certain patents granted to me, noticeably Patent No. 278,641, May 29, 1883.

Referring to Fig. 7, G G are the field-magnets, composed of comparatively heavy cores of iron wound with insulated coils and formed with closely-approaching pole-pieces, $g$, the inner faces of which are hollowed out. Between the pole-pieces $g$ is mounted a cylindrical armature, H, these parts being constructed to produce a practically-uniform magnetic field for the armature when the current is directed through the coils of the field-magnets. On the armature-shaft is fixed a grooved wheel, K, around which passes the cord $d$, the end of the same being made fast to the wheel, so that the movements of the armature wind up or unwind the cord. The field-circuit, or that which is formed by the coils on the magnets G, is connected with one of the conductors, M, of the main or branch line with which the meter is to be used. One commutator-brush is connected with each of the conductors M M′, so that the armature-coils are in a cross-circuit similar to those in which are included the incandescent lamps.

The operation of the apparatus is as follows: When the current is passing through the lamps, the magnets and the armature H will be rendered magnetic. In consequence the armature will be turned as far as the opposing force of the spring $f$ permits. This movement of the armature winds up the cord $d$ and draws over the frame C, brings the friction-wheel D from the center of the disk F, its normal position, where it receives no motion, over toward the periphery of said disk, imparting to it and to the recording mechanism a rotary movement proportionate to the distance from the center of the disk of the point upon which it rests. The register will hence be operated to record a number of units proportioned to the length of arc through which the armature H is turned. This arc will in turn be proportioned to the number of lamps burning, and to the strength of the current passing through them. The register, therefore, will give a correct indication of the total current-energy expended in a given time. This will more clearly appear from the following considerations: The field being uniform in which the armature moves, the extent of the rotation of the latter against the opposing force of the spring $f$ for a given electro-motive force will be proportionate to the strength of the field-magnets or to the amount of current flowing through the coils on the same. This is determined by the number of lamps in circuit. On the other hand, if the electro-motive force in the circuit be varied, the magnetic intensity of armature and field will be correspondingly varied by the strength of the current and a greater or less movement imparted to the armature. The apparatus, therefore, will afford a true record of the current-energy expended, inasmuch as without disturbing influences—such as the counter electro-motive force met with in rotary meters—it is effected by both the quantity and the strength of the current to a degree always proportionate to the same.

The construction of the recording as well as regulating mechanisms may be varied in many ways.

In Figs. 4, 5, and 6 a modified form of recording device is illustrated as an example of the variations of which the same is capable. L is a frame, in which is arranged a registering-train similar to that described. On the first spindle, $l$, of said train is fixed a drum, $m$. On another spindle, $n$, below the latter, is a similar drum, $p$. Spindle $n$ is designed to be turned by a train of clock-work or other moter at a constant rate of speed. Between the two drums, and in contact with both, is a friction-wheel, O, carried by a swinging arm or frame, P. This frame is journaled to short arms $t\,t$ on frame L by pins $p'\,p'$. On the upper pin, $p'$, is fixed a wheel, R, having a spiral groove, around which passes a cord, $d$, one end of which is connected to an adjustable spiral spring, S, and the other to the electro-magnetic regulator.

The operation of this device is as follows: Normally the frame P is held against a stop, T, by the spring S in a position to maintain the axis of the friction-wheel O at right angles to the axes of the drums $m\,p$. In this position no motion will be imparted to it by the rotation of the drum $p$. If the circuit be closed through one or more lamps, the armature of the regulator is moved against the opposing force of the spring S and the arm P turned more or less, according to the number of lamps in circuit or the strength of current passing through them, as has been heretofore explained. A swinging movement of the frame P brings the axis of wheel O to an oblique angle with those of the drums, and motion will thus be imparted to the wheel by drum *p*, and through it to the drum *m* and the register. It is evident that the number of turns of the wheel O and drum *m*, as compared with that of the drum *p*, will be proportional to the angle at which the wheel is held, being greatest or equal to that of drum *p* when the axis of wheel O is parallel to the axes of the drums. The clock-work by which this and any similar forms of meter are operated is wound up as often as necessary, and, as is usual in registering devices of this character, provision may be made for effecting this automatically, and for checking or locking it against movement when not in use. These matters of detail are not herein illustrated, as they do not form an essential part of the present invention. This principle of operation may be varied in many other ways, which it is not necessary to explain here.

With regard to the principle of the construction and operation of the regulator, the form shown, while regarded by me as the best, may be varied in many ways, it being only necessary to have an electro-magnetic system composed of a magnet and an armature constructed or arranged to operate in proportion to the amount and strength of the current acting upon it. The rotary cylindrical armature in a uniform field secures these conditions, because the armature is always at the same distance from the poles, and is moved in accordance with the amount as well as the strength of the current in a circuit when it is connected with the same in the manner described.

I have now described the general principles of the construction and operation of my invention. I do not limit myself to the mechanical details of the construction of either the recording or the regulating mechanism, nor to any particular mechanism for connecting the same in operation.

I am aware that a recording mechanism driven or operated by a prime motor has been combined with an electro-magnet and armature operating to vary the movement imparted to the recording mechanism in proportion to the degree of attraction exerted upon the armature. I am further aware that two independent electro-magnets in branches of the same circuit have been employed in conjunction with a recording mechanism for producing a record of the current that has passed in a circuit in a given time, and these features I do not broadly claim; but

What I claim is—

1. The combination, with a main circuit and multiple-arc or derived circuits, of a recording mechanism, a motor for imparting movement to the same, and regulating mechanism for varying and controlling the rate of movement of the recording mechanism, consisting of two electro-magnets, one stationary and the other movable, and included in the main circuit and in a derived circuit, respectively, all substantially as set forth.

2. The combination, with a main circuit and multiple-arc or derived circuits, of a recording mechanism, a motor for impelling or operating the same, a magnetic system comprising a fixed electro-magnet included in the main circuit, and a movable electro-magnet included in one of the multiple-arc circuits, and connections whereby the operation of the recording mechanism is varied and controlled in substantially the manner set forth.

3. The combination, with a recording mechanism and a motor for driving or operating the same, of an electro-magnetic system constructed substantially as a dynamo-electric machine or motor with a rotating armature and connections between the recording mechanism and the armature for controlling the operation of the recording mechanism by the tendency to rotation of the armature, all substially as set forth.

4. In a registering-meter, the combination, with a motor and friction disk or plate rotated thereby, of a pivoted frame, a train of registering-wheels carried thereby, a friction-wheel constituting one of said train and in contact with the friction-disk, and means for shifting its point of contact therewith, whereby a variable motion is imparted to the register, as set forth.

In testimony whereof I have hereunto set my hand this 23d day of November, 1883.

EDWARD WESTON.

Witnesses:
 HENRY A. BECKMEYER,
 RICHARD W. BLOEMEKE.